UNITED STATES PATENT OFFICE.

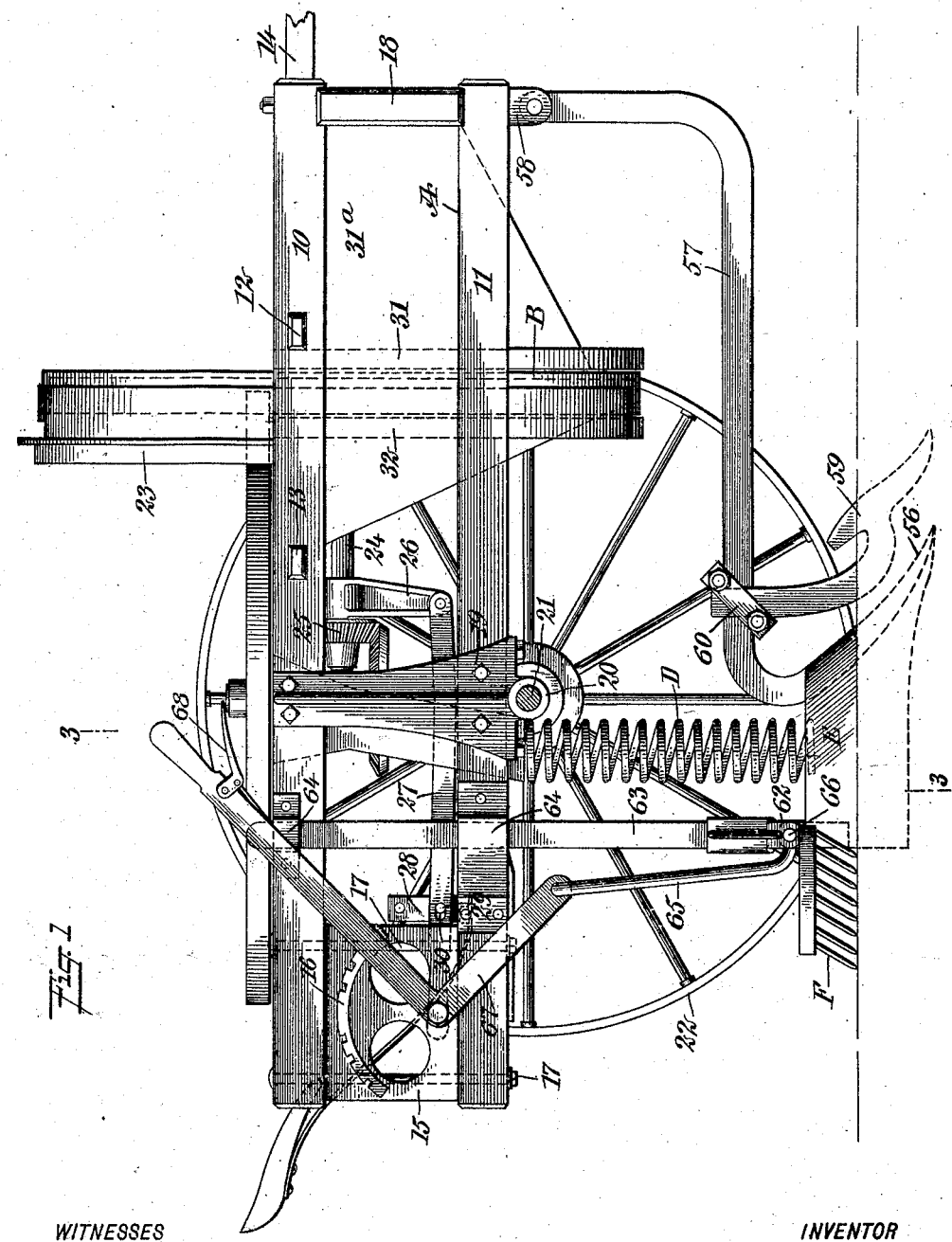

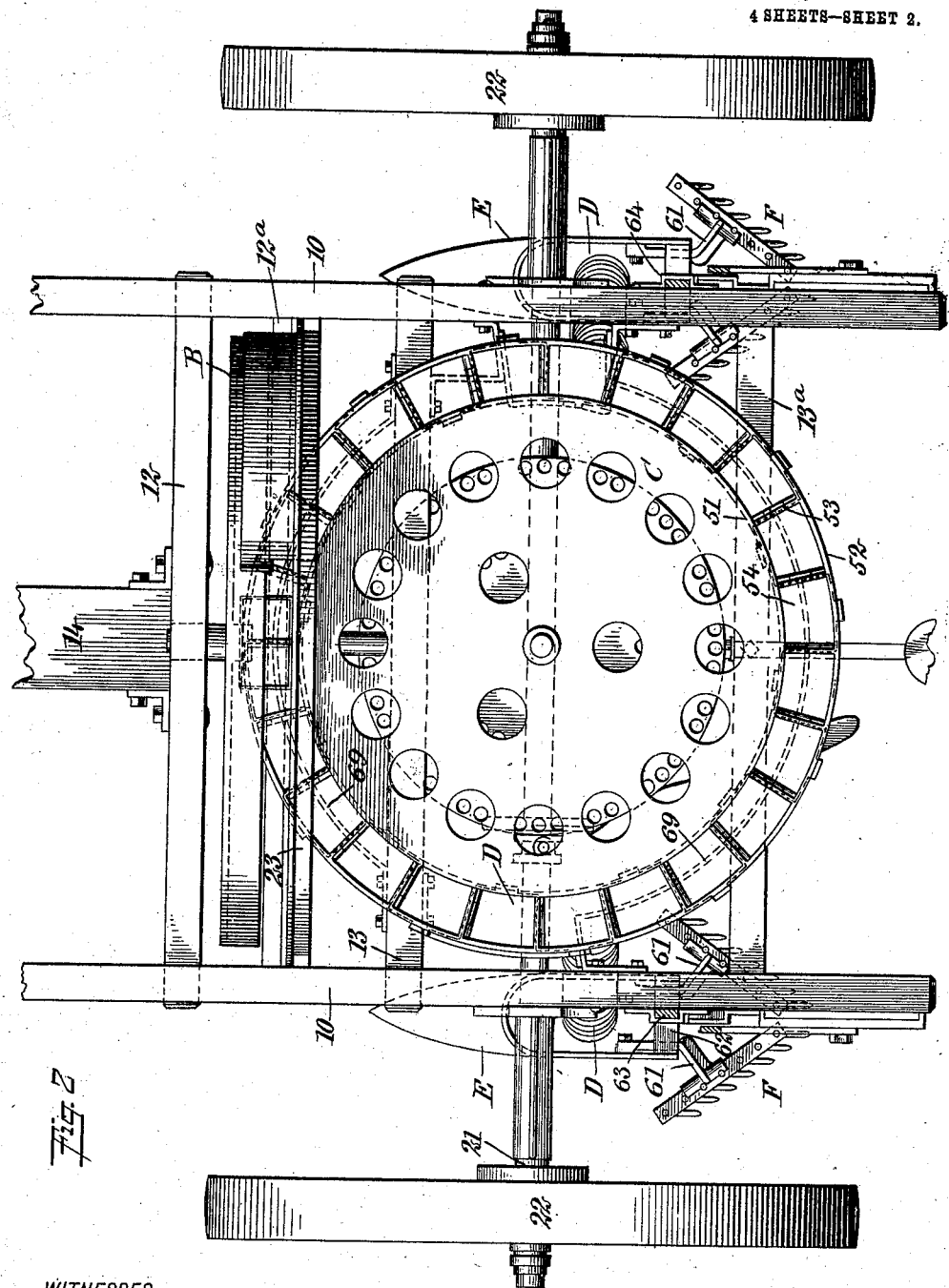

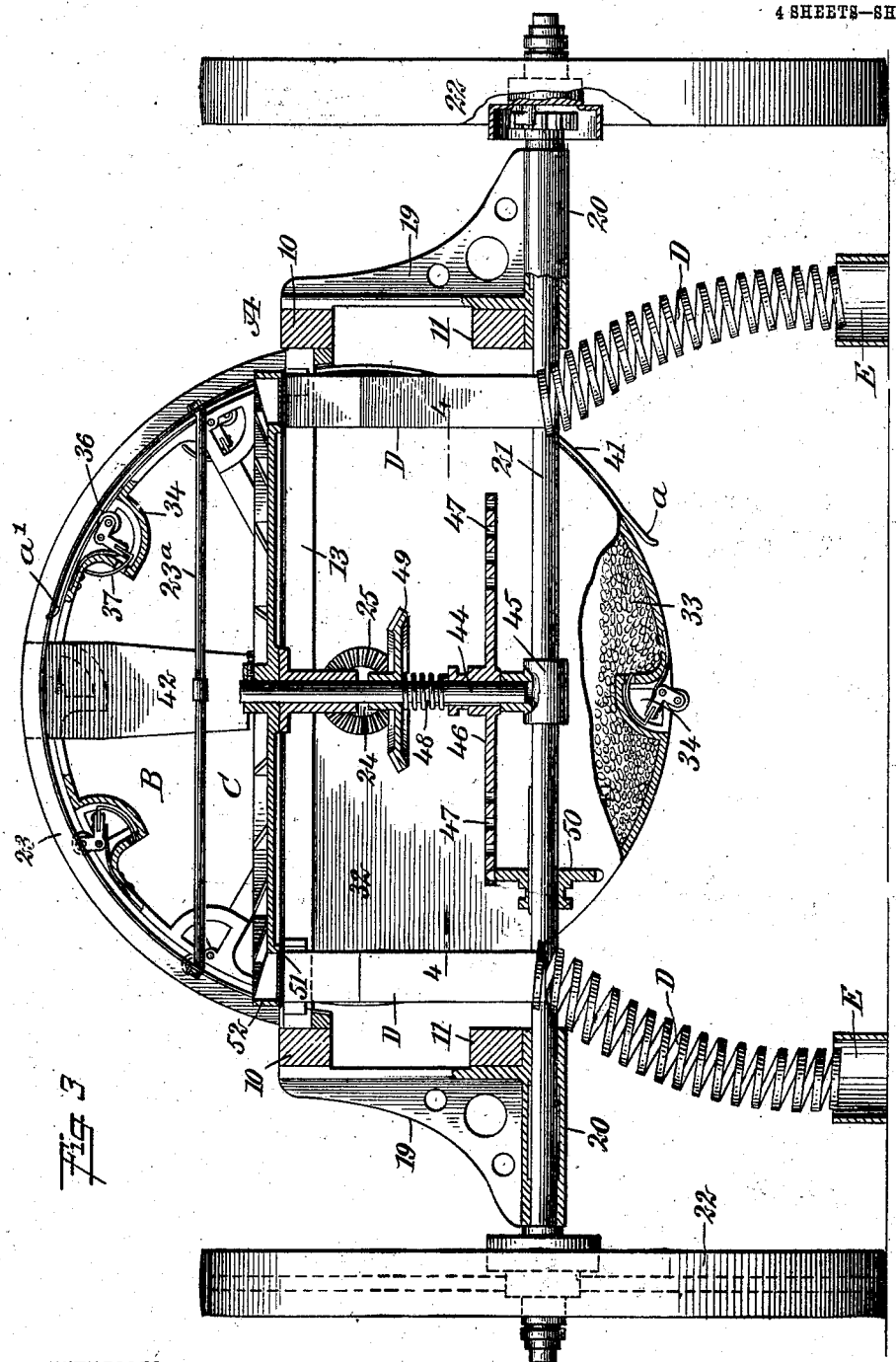

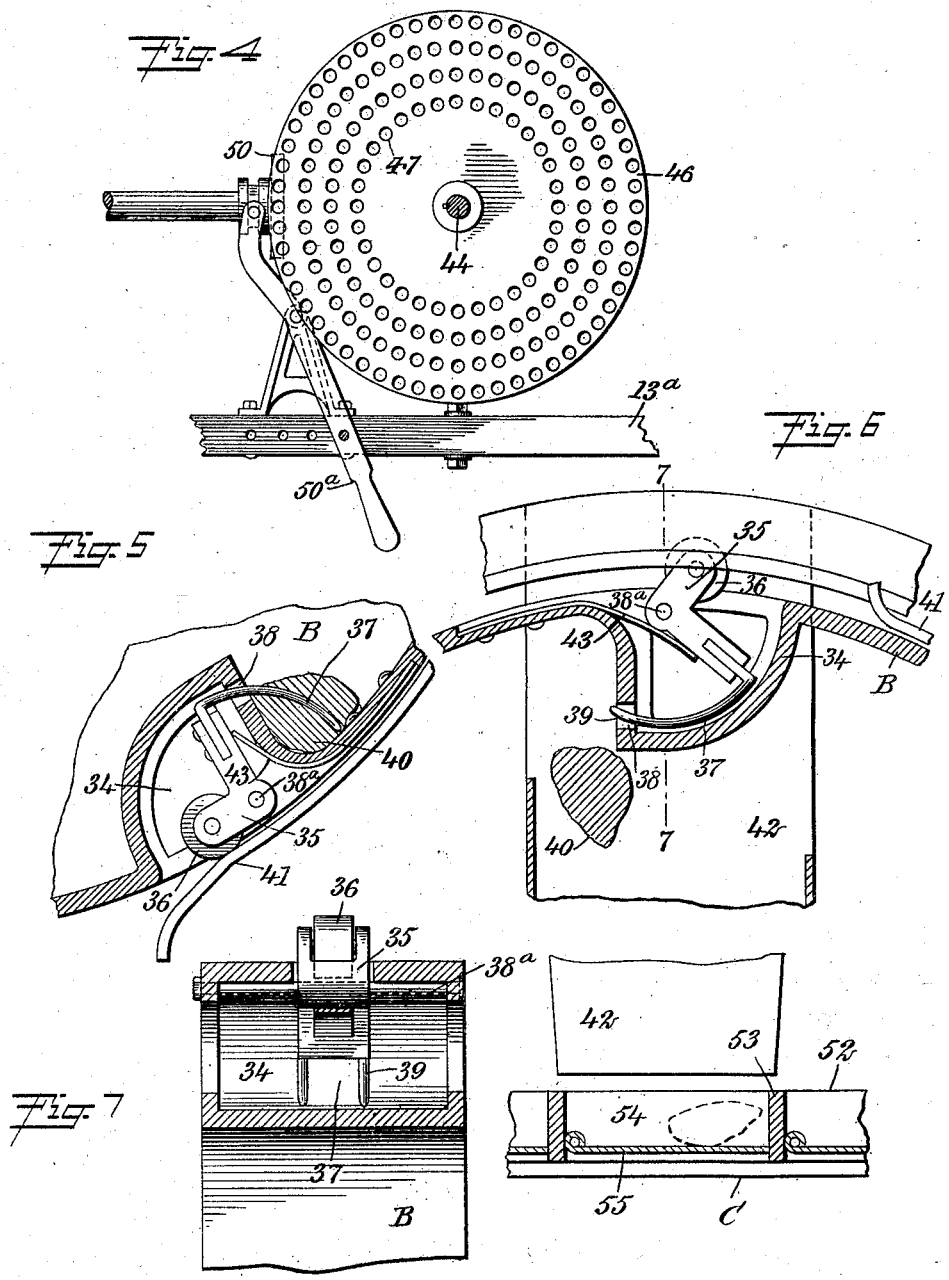

BRADLEY CHARLES McCOY, OF PONTIAC, MICHIGAN.

PLANTING-MACHINE.

No. 922,940.　　　　Specification of Letters Patent.　　　Patented May 25, 1909.

Application filed June 23, 1908. Serial No. 439,954.

*To all whom it may concern:*

Be it known that I, BRADLEY CHARLES McCOY, a citizen of the United States, and a resident of Pontiac, in the county of Oakland and State of Michigan, have invented a new and Improved Planting-Machine, of which the following is a full, clear, and exact description.

This invention relates to improvements in planting machines, and particularly to an improvement upon the machine for which Letters Patent No. 858,201 were granted to me on June 25, 1907, and the purpose of the invention is to provide a more efficient and simple means for distributing and separating potato or like seed and delivering the same to a conductor leading to a furrow, at suitable intervals.

It is also a purpose of the invention to provide an effective and simple device for covering the seed, and means whereby the speed at which the seed may be dropped is under complete control of the operator, together with means for regulating the covering device.

The invention consists in a device of this character comprising a seed separating and distributing device, means for delivering seed therefrom to a discharging device, means for making a furrow and depositing seed therein at predetermined intervals, and means for covering the deposited seed, all of said results being substantially automatically attained.

The invention also contemplates certain novel features of the construction and combination and arrangement of the several parts of the improved planting machine, whereby important advantages are attained, and the device is rendered simpler, less expensive and otherwise better adapted and more convenient for use, all as will be hereinafter fully set forth.

The novel features of the invention will be carefully defined in the claims.

In the accompanying drawings which serve to illustrate my invention, I have shown a planting machine embodying my improvements, but although the improvements are especially adapted for use in connection with a machine for planting potato and like seed, I do not desire to be understood as limiting myself to such special application, since the improvements are capable of use in connection with other machines or apparatus of similar character, with good results.

In the drawings, Figure 1 is a sectional side elevation of a planting machine having my improvements applied; Fig. 2 is a plan view of the machine shown in Fig. 1, parts being in section; Fig. 3 is a transverse section taken practically on the line 3—3 of Fig. 1; Fig. 4 is a detail horizontal section taken practically on the line 4—4 of Fig. 3; Fig. 5 is an enlarged vertical section through the distributing wheel, illustrating a retaining device carried thereby in position to hold a seed for delivery; Fig. 6 is a view similar to Fig. 5, but showing the seed carrying device as discharging the seed, the chute that receives the seed and the seed discharging device to which the chute leads, being in section; and Fig. 7 is a section through the distributing device, taken practically on the line 7—7 of Fig. 6.

Similar characters of reference indicate corresponding parts in all the views.

The frame A may be of any desired construction; as shown, it consists of upper and lower side beams 10 and 11, connected in any desired manner. The upper beams 10 are connected by forward cross bars 12 and 12ª, an intermediate cross bar 13, and a rear cross bar 13ª, as is shown in Fig. 2, and a suitable tongue or pole 14 is provided. At the rear of the frame, side plates 15 are located between the beams 10 and 11, carrying segment racks 16 on their outer faces, and at this point the side beams 10 and 11 are usually connected by bolts 17 or equivalent tie devices; and at the forward end of the frame the said side beams are shown as connected by standards 18. Pedestals 19 are also connected with the side beams 10 and 11 at a point, by preference, at the rear of the center, as is shown in Figs. 1 and 3, and each pedestal has a bearing 20 formed at its lower end for an axle 21, that is provided with supporting wheels 22, the wheels having a pawl and ratchet connection with the axle, as shown at the right in Fig. 3, for a purpose which will be readily understood.

In the further construction of the frame an arch 23, preferably of angle iron, is located between the center and the front, extending from one upper side beam to the other and braced by a suitable cross bar 23ª, as is shown in Fig. 3.

A longitudinal shaft 24 is horizontally mounted in suitable bearings at the upper forward central portion of the machine, as is shown in Figs. 1 and 2, which shaft is provided at its rear end with a bevel gear 25, to be driven as will be hereinafter stated. The shaft 24 has a bracket 26 secured thereto near its rear end, said bracket extending downwardly as is shown in Fig. 1, and a horizontal lever arm 27 is pivoted to the bracket which arm leading rearward is guided by a standard 28 of suitable character, having a projection 29 that extends through a slot 30 in the lever arm, and limits its movement, as is also shown in Fig. 1. Any desired means for locking the lever arm 27, may be employed.

A vertically disposed seed distributing wheel B is splined to the shaft 24 in such manner that the wheel may slide on the shaft, but said wheel turns with said shaft. This wheel, the rim of which may be of any desired width, is provided at each side of its lower central portion with closing plates or partitions 31 and 32, shown particularly in Fig. 1, whereby to hold the seed potatoes 33, at the lower portion of the distributing wheel B as is shown in Fig. 3. The potatoes are placed in a hopper 31ª that is located at the forward end of the machine, and through which the lower portion of the distributing wheel B passes, in such manner that the seed potatoes cannot escape.

Pockets 34 of approximately U-shaped formation, are produced in the periphery of the said seed distributing wheel B, and an angular arm 35 is mounted for rocking movement in each pocket. One member of each arm 35 practically follows the peripheral contour of the distributing wheel B, when the arm is in action, as is shown in Fig. 5. The outer member of each arm 35 is provided with a friction roller 36, and the inner member of each arm 35 has a piercing device 37 attached thereto, that extends through an opening 38 in the straight wall of a pocket 34, as is shown in Figs. 5 and 6. Each piercing device 37 is outwardly curved, and is preferably of skeleton formation, as is shown in Fig. 7, and each of said devices carries two needle-like points 39 at its outer end, see Figs. 5, 6 and 7, whereby to pierce or spear a slice 40 of potato that it may come in contact with, one of such slices being shown in Fig. 5. The angular arm 35 and the retaining devices carried thereby, constitute seed carriers, and each arm 35 is pivoted at the junction of its members, in a pocket 34, by means of a suitably mounted pivot pin 38ª.

The rollers 36 of the pivoted arms 35, when a seed potato is to be picked up, engage a track 41 located near the periphery of the seed distributing wheel B at the ascending side, see Figs. 5 and 6. This track extends from a point adjacent to the bottom of the wheel B, to a point adjacent to its upper central portion, as is indicated at a and a' in Fig. 3 In the operation of this portion of the machine, as the distributing wheel B is revolved, and as the roller 36 of a pivoted angle arm 35 engages the lower portion of the track 41, as is shown in Fig. 5, the piercing member 37 connected therewith is thrown outward, a slice of potato is speared by the points 39 of the piercing device 37, and this slice of seed is held firmly in engagement with the straight wall of the pocket carrying the arm, during the entire time that the wheel 36 engages with the track 41.

When the special seed carrier in service reaches and passes the upper end of the track 41, the seed is released and is delivered into a chute 42, downwardly directed and centrally supported at the central portion of the arched brace 23. This is accomplished through the medium of a spring 43, one of which has such bearing on each arm 35 as to throw its roller-carrying member outward, as soon as released, thereby drawing the piercing device 37 within a pocket and releasing the seed, as shown in Fig. 6.

A shaft 44 is driven from the axle 21, being properly seated in a socket 45 in which the axle freely turns, as is shown in Fig. 3. The shaft 44 has secured thereto a horizontal speed regulating wheel 46, having series of apertures 47 therein, as is shown in Figs. 3 and 4. A spring 48 is coiled about the shaft 44, having bearing upon the hub of the said wheel 46, and against a bevel wheel 49, holding the latter in engagement with the gear 25 on the horizontal shaft 24, whereby through the movement of the machine, motion is imparted to the distributing wheel B. The shaft 44 is driven and the speed of its rotation is controlled by a pinion 50 splined and mounted for movement upon the axle 21, as shown in Fig. 3, which pinion can be brought into engagement with any of the series of apertures 47 in said speed wheel 46, the pinion 50 being a sprocket pinion. It may be here remarked that any approved means may be employed for adjusting the speed wheel if so desired, and a lever 50ª, shown in Fig. 4, or any other customary means, may be employed for shifting the sprocket pinion 50.

A seed discharge device C, is secured to the upper end of the shaft 44, being horizontally disposed, and is in the nature of a wheel, being provided with an inner rim 51 and an outer rim 52, connected by transverse partitions 53, forming the end wall of seed pockets 54, in which the seeds are deposited as they are discharged from the distributing wheel B through the medium of the chute 42. Each pocket 54 has a downwardly swinging bottom plate 55, which plates are alternately released to deposit seed in conductors D at opposite sides of the machine, as will be hereinafter described and as is shown in Figs. 2 and 3. As shown in Fig. 3, the portions of the conductors D below the axle 21 are constructed of spring steel coils, and their lower ends are connected to shoes E, that are practically furrow openers since they enter the ground and have a forward cutting edge and accompanying points 56 as is shown in Fig. 1.

It will be seen that the construction of the lower portions of the conductors D is such that they expand or contract with the lowering or raising of the members E.

As the furrow is opened by the members E, the seed is dropped from the discharge device C, through the conductors D and shoes E into said furrow, and then the seed is covered by rakes F, that follow the said shoes E. The shoes are supported by arms or beams 57 that are pivoted at 58 to the side portions of the frame A, as is shown in Fig. 1, but the furrows are primarily opened by what may be termed colter blades 59, secured by clips 60 or otherwise, to the arms or beams 57, slightly in advance of the shoes or hollow shares E, as is also shown in Fig. 1.

The rakes F are V-shaped, the converging ends pointing rearward, as is shown in Fig. 2, and braces 61, from their members are secured to the rear portions of the shoes E, as is also shown in Fig. 2. A strap 62 is located at the rear end portion of each shoe, and a guide strap 63 is secured to each strap 62, being passed up loosely through guides 64 secured to the frame, as is shown in Figs. 1 and 2. A rod 65 is pivotally attached to a pin 66 passed through each strap 62, and each rod 65 is pivotally connected with the lower end of an elbow 67, one of said levers being pivoted to each rear plate 15, and having a thumb latch 68 for engagement with a rack 16. Thus it will be observed that as a lever 67 is operated, the furrow openers E and the blades 59 and the rakes F are raised and lowered.

Tracks 69 (shown in dotted lines) are located below the discharge wheel C, and terminate at the mouth portions of the conductors D, as shown in Fig. 2. These tracks serve to keep closed the bottom portions 55 of the pockets 54, until they reach the mouth of said conductors, whereupon they automatically open and drop the seed into said conductors.

Having thus described my invention, I claim as new, and desire to secure by Letters Patent:

1. In a seed planter, a seed distributing wheel adapted to contain potatoes and having peripheral pockets formed therein, seed carriers within said pockets, consisting of pivoted arms, seed holding members carried by the arms, operating through the walls of said pockets, and means for automatically projecting the said holding members from the pockets, and means, after releasing from the first named means, for drawing said holding members into said pockets.

2. In a seed planter, a distributing wheel adapted to contain potatoes and having peripheral pockets, spring-controlled arms pivoted in the pockets, seed holding members carried by the arms and adapted for movement through the walls of said pockets, and a fixed member exterior of the wheel and adapted for bearing upon said arms during a portion of the rotation of the wheel, to hold the holding arms in position to hold the seed for delivery.

3. In a potato planter, the combination with a distributing wheel provided with peripheral pockets, which wheel is adapted to contain seed potatoes, angular arms pivoted in said pockets, and holding members secured to said arms, adapted for movement to and from the pockets, of a fixed exterior member that engages with said arms during a portion of the rotation of the wheel, holding the said members projected from the pockets, and means for returning said holding members into said pockets when released from the action of said fixed member.

4. In a potato planter, in combination, a distributing wheel adapted to contain seed and provided with peripheral pockets, spring-controlled angular arms pivoted in said pockets, friction rollers mounted upon said arms, holding members carried by said arms and adapted for movement through a wall of the pockets, and a fixed controlling member for the arms, arranged exterior of the wheel and engaged by said arms during a portion of the rotation of the wheel.

5. In a potato planter, in combination, a distributing wheel adapted to contain potatoes and provided with peripheral pockets, spring-controlled arms pivoted in said pockets, seed holding members carried by said arms, arranged for movement to and from the walls of said pockets, and adapted when projected from the pockets to each hold a seed, a stationary member exterior of the wheel that operates on said arms during a portion of the revolution of the wheel, a seed discharging device, and means for supplying seed thereto from the seed distributing device.

6. In a potato planter, a distributing wheel provided with peripheral pockets having openings in one wall, angular arms mounted in the pockets and provided with piercing points adapted to project through the openings of the pockets, and tracks extending partially around the wheel and with which one member of the angular arm is adapted to engage.

7. In a potato planter, a distributing wheel provided with peripheral pockets having openings in one wall, pivoted and spring pressed angular arms in the pockets and provided with piercing points adapted to project through the openings of the pockets, and tracks extending partially around the wheel and with which one member of the angular arm engages to project the piercing points thereof.

8. In a potato planter, a distributing wheel provided with peripheral pockets having openings in one wall, angular arms pivoted in the pockets and carrying a roller at the end of one member, and piercing points on its other member, a track extending partially around the wheel and with which the roller of the angular arm is adapted to engage to project the piercing points, and a spring operating upon the said arm to retract the points thereof.

9. A potato planter, comprising a distributing wheel adapted to contain potatoes and having peripheral pockets, spring controlled arms in the pockets and provided with seed holding members adapted to project through walls of the pockets into the wheel, means for operating the said members, a seed discharging wheel having pockets provided with hinged bottoms, and chutes into which the said pockets discharge the potatoes.

10. A potato planter, comprising a distributing wheel adapted to contain potatoes and provided with peripheral pockets, spring controlled seed holding members mounted in the pockets and adapted to be projected through the walls thereof, means for operating the said members, a seed discharging wheel having pockets provided with hinged bottoms, chutes having flexible lower ends below the wheel, a shoe on the lower end of the chute, and a pivoted beam to which the shoe is secured.

11. In a seed planter, seed feeding mechanism, a chute for receiving the seed from the feeding mechanism and having a flexible lower end, a shoe on the lower end of the chute, a V-shaped rake having its converging end pointing rearward and having its members connected to the shoe, and means for raising and lowering the shoe and rake.

12. In a seed planter, seed feeding mechanism, a chute for receiving the seed therefrom, having a flexible lower end, a shoe on the lower end of the chute, a pivoted beam to which the shoe is secured, a V-shaped rake having its converging end pointing rearward and connected to the shoe, a sliding bar secured to the rake, a pivoted lever, and a connection between the lever and rake.

In testimony whereof I have signed my name to this specification in the presence of two subscribing witnesses.

BRADLEY CHARLES McCOY.

Witnesses:
  JOHN E. BRONDIGE,
  DANCE W. LAMB.